United States Patent
Ito et al.

(10) Patent No.: US 10,054,344 B2
(45) Date of Patent: Aug. 21, 2018

(54) EXPANSION VALVE AND REFRIGERATION CYCLE APPARATUS

(71) Applicant: Mitsubishi Electric Corporation, Tokyo (JP)

(72) Inventors: Masahiro Ito, Tokyo (JP); Yusuke Shimazu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 88 days.

(21) Appl. No.: 15/314,518

(22) PCT Filed: Jul. 2, 2014

(86) PCT No.: PCT/JP2014/067619
§ 371 (c)(1),
(2) Date: Nov. 29, 2016

(87) PCT Pub. No.: WO2016/002022
PCT Pub. Date: Jan. 7, 2016

(65) Prior Publication Data
US 2017/0191717 A1    Jul. 6, 2017

(51) Int. Cl.
F25B 41/06 (2006.01)
F25B 41/04 (2006.01)
G05D 23/12 (2006.01)

(52) U.S. Cl.
CPC ............ *F25B 41/062* (2013.01); *F25B 41/04* (2013.01); *F25B 41/06* (2013.01); *G05D 23/12* (2013.01)

(58) Field of Classification Search
CPC ........ F25B 31/04; F25B 31/06; F25B 31/062; G05D 23/12
(Continued)

(56) References Cited

U.S. PATENT DOCUMENTS 3,815,379 A * 6/1974 Scherer ................. F25B 41/067
62/296
7,225,630 B2 * 6/2007 Hirakuni ................. F25B 13/00
236/92 B
(Continued)

FOREIGN PATENT DOCUMENTS

CN    2433488 Y    6/2001
CN    101466986 A    6/2009
(Continued)

OTHER PUBLICATIONS

Office Action dated Jun. 23, 2015 in the corresponding JP application No. 2015-516938 (with English translation).
(Continued)

*Primary Examiner* — Marc Norman
(74) *Attorney, Agent, or Firm* — Posz Law Group, PLC

(57) ABSTRACT

An expansion valve includes a main body including a first valve chamber having a first opening communicating with a first pipe, a second valve chamber having a second opening communicating with a second pipe, and a valve hole connecting the first valve chamber and the second valve chamber to each other, a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other, a first porous member provided in a first passage between the first pipe and the valve hole, and a first shield member provided in a region of the first passage between the first pipe and the first porous member, and shields a part of a passage cross-section of the first passage.

17 Claims, 6 Drawing Sheets

(58) Field of Classification Search
USPC .................................................. 236/92 B
See application file for complete search history.

(56) References Cited

U.S. PATENT DOCUMENTS

| | | | | |
|---|---|---|---|---|
| 7,290,567 | B2* | 11/2007 | Hirakuni | F25B 13/00 138/45 |
| 8,052,064 | B2* | 11/2011 | Yukimoto | F25B 41/062 236/92 B |
| 2008/0290306 | A1 | 11/2008 | Okuda | |
| 2009/0183520 | A1 | 7/2009 | Yukimoto | |

FOREIGN PATENT DOCUMENTS

| JP | 57-129371 A | 8/1982 |
|---|---|---|
| JP | 09-310939 A | 12/1997 |
| JP | 11-013500 A | 1/1999 |
| JP | 2001-311570 A | 11/2001 |
| JP | 2005-055119 A | 3/2005 |
| JP | 2005-226846 A | 8/2005 |
| JP | 2006-077955 A | 3/2006 |
| JP | 2006-084108 A | 3/2006 |
| JP | 2006-284088 A | 10/2006 |
| JP | 2007-040330 A | 2/2007 |
| JP | 2008-032380 A | 2/2008 |
| JP | 2008-291916 A | 12/2008 |
| JP | 2012-154529 A | 8/2012 |
| JP | 2012-159180 A | 8/2012 |
| JP | 2013-164211 A | 8/2013 |

OTHER PUBLICATIONS

International Search Report of the International Searching Authority dated Sep. 16, 2014 for the corresponding international application No. PCT/JP2014/067619 (and English translation).
Invitation pursuant to Rule 62a(1) EPC dated Nov. 12, 2017 issued in the corresponding EP patent application No. 14896909.0.
Chinese Office Action dated Jun. 1, 2018 for the corresponding CN application No. 201480079302.0(with English translation).

* cited by examiner

EXPANSION VALVE AND REFRIGERATION CYCLE APPARATUS

CROSS REFERENCE TO RELATED APPLICATION

This application is a U.S. national stage application of PCT/JP2014/067619 filed on Jul. 2, 2014, the contents of which are incorporated herein by reference.

TECHNICAL FIELD

The present invention relates to an expansion valve and a refrigeration cycle apparatus.

BACKGROUND ART

A conventional expansion valve includes, for example, a main body that includes a first valve chamber, a second valve chamber, and a valve hole connecting the first valve chamber and the second valve chamber, and a valve body that includes a first cylindrical main shaft provided in the first valve chamber, a second cylindrical main shaft provided in the second valve chamber, and a constricted portion provided in the valve hole and connecting the first main shaft and the second main shaft to each other. The first valve chamber communicates with the first pipe of a refrigerant circuit via a first opening, and the second valve chamber communicates with the second pipe of the refrigerant circuit via a second opening. When refrigerant flows into the first valve chamber from the first pipe, a portion between the valve body and a valve seat that is an end portion of the valve hole serves as an expansion portion, and the expanded refrigerant flows into the second pipe. When the refrigerant flows into the second valve chamber from the second pipe, the portion between the valve body and the valve seat that is the end portion of the valve hole serves as an expansion portion, and the expanded refrigerant flows into the first pipe (e.g., see Patent Literature 1).

CITATION LIST

Patent Literature

Patent Literature 1: Japanese Unexamined Patent Application Publication No, 2012-159180 (paragraphs [0025] to [0065], FIGS. 1 to 6)

SUMMARY OF INVENTION

Technical Problem

In a conventional expansion valve, when two-phase gas-liquid refrigerant flows into the expansion portion, refrigerant pulsation is caused to excite natural oscillation of the expansion valve. Thus, noise increases compared with a case in which single-phase (liquid-phase) refrigerant flows into the expansion portion. To suppress the increase in noise, a porous member is provided on the upstream side of the expansion portion to cause bubbles atomized in the porous member to flow into the expansion portion.

However, for example, when two-phase gas-liquid refrigerant having high quality (percentage of the mass of gas-phase refrigerant) flows into the expansion valve at a low rate, the flow of the refrigerant becomes a two-phase flow (stratified flow) in which gas and liquid are separated. A decrease of the amount of bubbles increases difficulty in atomizing the bubbles in the porous member, and thus refrigerant pulsation is difficult to be suppressed. That is, in some cases, the increase in noise in a conventional expansion valve may be difficult to be suppressed.

In view of the problems, the present invention is to provide an expansion valve in which suppression of the increase in noise is unlikely to be hindered and to provide a refrigeration cycle apparatus including such an expansion valve.

Solution to Problem

An expansion valve according to an embodiment of the present invention includes a main body including a first valve chamber having a first opening communicating with a first pipe, a second valve chamber having a second opening communicating with a second pipe, and a valve hole connecting the first valve chamber and the second valve chamber to each other, a valve body including a first main shaft, at least a part of which is provided in the first valve chamber, a second main shaft, at feast a part of which is provided in the second valve chamber, and a constricted portion provided in the valve hole and connecting the first main shaft and the second main shaft to each other, a first porous member provided in a first passage between the first pipe and the valve hole, and a first shield member provided in a region of the first passage between the first pipe and the first porous member, and shields a part of a passage cross-section of the first passage.

An expansion valve according to an embodiment of the present invention includes a main body including a first valve chamber having a first opening communicating with a first pipe, a second valve chamber having a second opening communicating with a second pipe, and a valve hole connecting the first valve chamber and the second valve chamber to each other, a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other, and a first porous member provided in a first passage between the first pipe and the valve hole. In the expansion valve, projections and grooves are formed in a lower portion, in the gravitational direction, of the inner circumferential surface of a region of the first passage between the first pipe and the first valve chamber. The projections and grooves are aligned in an axial direction of the first passage.

An expansion valve according to an embodiment of the present invention includes a main body including a first valve chamber having a first opening communicating with a first pipe, and a valve hole connecting the first valve chamber and a second pipe to each other, a valve body controlling the opening degree of the valve hole, a first porous member provided in a first passage between the first pipe and the valve hole, and a first shield member provided in a region of the first passage between the first pipe and the first porous member, and shielding a part of a passage cross-section of the first passage. In the expansion valve, the first shield member is provided in the first valve chamber, has, on at least a part of the first shield member, a flat surface opposed to the first opening with a gap between the flat surface and the first opening and perpendicular to the axial direction of the first opening, or a recessed surface opposed to the first opening with a gap between the recessed surface and the first opening and recessed in a direction away from the first opening.

A refrigeration cycle apparatus according to an embodiment of the present invention includes a first pipe, and an expansion valve including a main body including a first valve chamber having a first opening communicating with the first pipe, a second valve chamber having a second opening communicating with a second pipe, and a valve hole connecting the first valve chamber and the second valve chamber to each other, a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other, and a first porous member provided in a first passage between the first pipe and the valve hole. In the refrigeration cycle apparatus, projections and grooves are formed in a lower portion of the inner circumferential surface of the first pipe in the gravitational direction. The projections and grooves are aligned in an axial direction of the first pipe.

Advantageous Effects of Invention

The expansion valve according to an embodiment of the present invention is provided with the first shield member in a region of the first passage between the first pipe and the first porous member and the first shield member shields the part of the passage cross-section of the first passage. Thus, for example, when two-phase gas-liquid refrigerant having high quality (percentage of the mass of gas-phase refrigerant) flows into the expansion valve at a low rate, the flow of the refrigerant of a two-phase flow (stratified flow) in which gas and liquid are separated is mixed in the first shield member, thereby increasing the amount of bubbles. In this state, the refrigerant flows into the first porous member to allow the bubbles to be atomized in the first porous member, and thus suppression of an increase in noise is unlikely to be hindered. Especially in the case in which the first shield member provided in the first valve chamber has, on at least a part of the first shield member, a flat surface opposed to the first opening with a gap between the flat surface and the first opening and perpendicular to the axial direction of the first opening, or a recessed surface opposed to the first opening with a gap between the recessed surface and the first opening and recessed in a direction away from the first opening, the mixing effects of the gas-phase refrigerant and liquid-phase refrigerant improves. Thus, the suppression of the increase in noise is more unlikely to be hindered.

In the expansion valve according to an embodiment of the present invention, projections and grooves are formed in a lower portion, in the gravitational direction, of the inner circumferential surface of a region of the first passage between the first pipe and the first valve chamber, and the projections and grooves are aligned in an axial direction of the first passage. Moreover, in the refrigeration cycle apparatus according to an embodiment of the present invention, projections and grooves are formed in a lower portion of the inner circumferential surface of the first pipe in the gravitational direction, and the projections and grooves are aligned in an axial direction of the first pipe. Thus, for example, when the two-phase gas-liquid refrigerant having high quality (percentage of the mass of the gas-phase refrigerant) flows into the expansion valve at a low rate, the flow of the refrigerant of a two-phase flow (stratified flow) in which gas and liquid are separated is mixed in the projections and grooves aligned in the axial direction of the first pipe, thereby increasing the amount of bubbles. In this state, the refrigerant flows into the first porous member to allow the bubbles to be atomized in the first porous member, and thus the suppression of the increase in noise is unlikely to be hindered.

DESCRIPTION OF EMBODIMENTS

An expansion valve according to the present invention is described below with reference to the drawings.

It should be noted that in the following description, a refrigeration cycle apparatus in which the expansion valve according to the present invention is used is an air-conditioning apparatus; however, the present invention is not limited to this example, and the refrigeration cycle apparatus in which the expansion valve according to the present invention is used may be a refrigeration cycle apparatus other than the air-conditioning apparatus. Moreover, configurations, operations, and other details described below are mere examples, and the present invention is not limited to the described configurations, operations, and other details. Specific explanations for the configurations, operations, and other details are appropriately simplified or omitted. Overlapping or similar explanations are also appropriately simplified or omitted.

Embodiment 1

An expansion valve according to Embodiment 1 is described below.
<Configuration and Operation of Air-Conditioning Apparatus>

The configuration and operation of an air-conditioning apparatus in which the expansion valve according to Embodiment 1 is used are described below.

Figure 1:
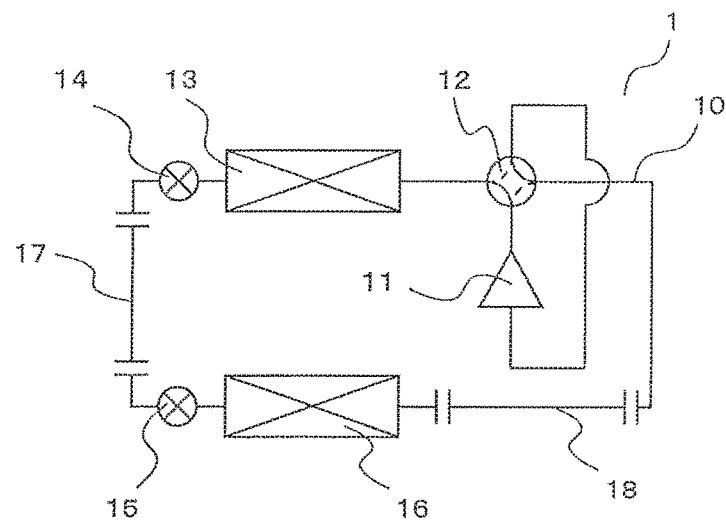
FIG. 1 is a figure for explaining the configuration and operation of an air-conditioning apparatus in which an expansion valve according to Embodiment 1 of the present invention is used.

FIG. 1 is a figure for explaining the configuration and operation of the air-conditioning apparatus in which the expansion valve according to Embodiment 1 of the present invention is used.

As FIG. 1 illustrates, an air-conditioning apparatus 1 includes a refrigerant circuit 10 in which a compressor 11, a four-way valve 12, a heat source side heat exchanger 13, a first expansion valve 14, a second expansion valve 15, and a load side heat exchanger 16 are connected in a loop. That is, the refrigerant circuit 10 is a two-step expansion circuit. The four-way valve 12 may be another flow switching device.

The compressor 11, the four-way valve 12, the heat source side heat exchanger 13, and the first expansion valve 14 are provided in an outdoor unit, and the second expansion valve 15 and the load side heat exchanger 16 are provided in an indoor unit. The first expansion valve 14 and the second expansion valve 15 are connected via an extension pipe 17, and the load side heat exchanger 16 and the four-way valve 12 are connected via an extension pipe 18.

When the air-conditioning apparatus 1 performs a cooling operation, the flow path of the four-way valve 12 is changed to the flow path illustrated by the solid line in FIG. 1, and refrigerant flowing through the refrigerant circuit 10 circulates through the compressor 11, the four-way valve 12, the heat source side heat exchanger 13, the first expansion valve 14, the second expansion valve 15, the load side heat exchanger 16, and the four-way valve 12 in this order.

The pressure of low-pressure gas-phase refrigerant is increased by the compressor 11, and the low-pressure gas-phase refrigerant becomes high-temperature, high-pressure gas-phase refrigerant. The gas-phase refrigerant passes through the four-way valve 12, and the heat of the gas-phase refrigerant is transferred to the ambient air at the heat source side heat exchanger 13. The gas-phase refrigerant is condensed as a result of the heat transfer to the ambient air and becomes liquid-phase refrigerant having a decreased temperature. The liquid-phase refrigerant is decompressed by the first expansion valve 14 and becomes low-pressure two-phase gas-liquid refrigerant. The liquid portion of the two-phase gas-liquid refrigerant is further expanded by the second expansion valve 15 and becomes two-phase gas-liquid refrigerant having increased quality. The two-phase gas-liquid refrigerant receives heat from indoor air at the load side heat exchanger 16, and the liquid portion evaporates. The temperature of the gas-phase refrigerant increases due to the heat reception from the ambient air, and the gas-phase refrigerant having an increased temperature flows into the compressor 11 again. That is, when the air-conditioning apparatus 1 performs the cooling operation, the heat source side heat exchanger 13 serves as a condenser, and the load side heat exchanger 16 serves as an evaporator.

When the air-conditioning apparatus 1 performs a heating operation, the flow path of the four-way valve 12 is changed to the flow path illustrated by the dotted line in FIG. 1, and the refrigerant flowing through the refrigerant circuit 10 circulates through the compressor 11, the four-way valve 12, the load side heat exchanger 16, the second expansion valve 15, the first expansion valve 14, the heat source side heat exchanger 13, and the four-way valve 12 in this order.

The pressure of the low-pressure gas-phase refrigerant is increased by the compressor 11, and the low-pressure gas-phase refrigerant becomes high-temperature, high-pressure gas-phase refrigerant. The gas-phase refrigerant passes through the four-way valve 12, and the heat of the gas-phase refrigerant is transferred to the indoor air at the load side heat exchanger 16. The gas-phase refrigerant is condensed as a result of the heat transfer to the indoor air and becomes liquid-phase refrigerant having a decreased temperature. The liquid-phase refrigerant is decompressed by the second expansion valve 15 and becomes low-pressure two-phase gas-liquid refrigerant. The liquid portion of the two-phase gas-liquid refrigerant is further expanded by the first expansion valve 14 and becomes two-phase gas-liquid refrigerant having increased quality. The two-phase gas-liquid refrigerant receives heat from the ambient air at the heat source side heat exchanger 13, and the liquid portion evaporates. The temperature of the gas-phase refrigerant increases due to the heat reception from the ambient air, and the gas-phase refrigerant having an increased temperature flows into the compressor 11 again. That is, when the air-conditioning apparatus 1 performs the heating operation, the heat source side heat exchanger 13 serves as an evaporator, and the load side heat exchanger 16 serves as a condenser.

In a typical refrigerant circuit, the number of expansion valves connected between the condenser and the evaporator is one. Thus, during a cooling operation or heating operation, the refrigerant passing through the extension pipe 17 becomes liquid-phase refrigerant, and the amount of the refrigerant contained in the refrigerant circuit increases. Meanwhile, in the two-step expansion circuit as illustrated in FIG. 1, during both of the cooling operation and heating operation, the refrigerant passing through the extension pipe 17 can be two-phase gas-liquid refrigerant, and the amount of the refrigerant contained in the refrigerant circuit 10 can be decreased. However, when the refrigerant passing through the extension pipe 17 is the two-phase gas-liquid refrigerant, the two-phase gas-liquid refrigerant continuously flows into the expansion portions of the expansion valves (the first expansion valve 14 and the second expansion valve 15), thereby causing refrigerant pulsation and exciting natural oscillation of the expansion valves (the first expansion valve 14 and the second expansion valve 15) and possibly causing a structure-borne sound. Thus, in the refrigerant circuit 10, an expansion valve 20 described below is employed as the expansion valves (the first expansion valve 14 and the second expansion valve 15).

<Configuration of Expansion Valve>

The configuration of the expansion valve according to Embodiment 1 is described below.

Figure 2:
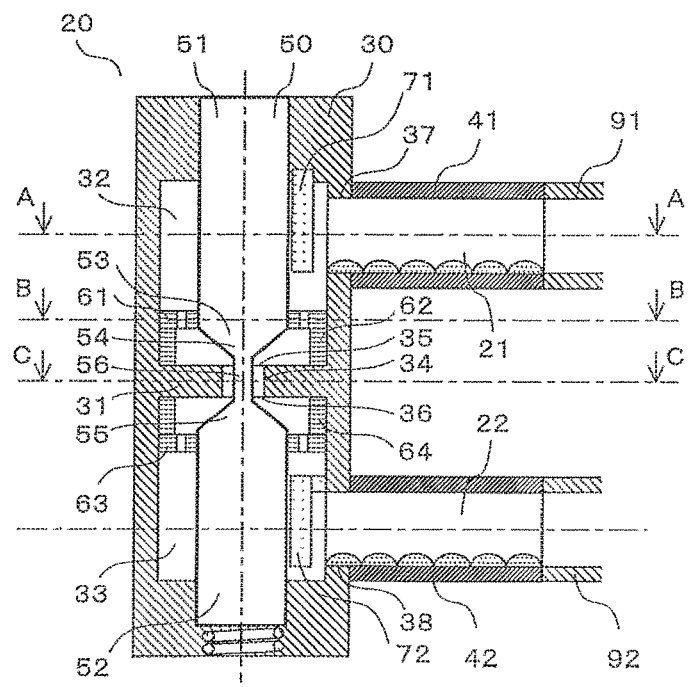
FIG. 2 is a cross-sectional view of the expansion valve according to Embodiment 1 of the present invention and of pipes connected to the expansion valve in the axial direction of the expansion valve.
Figure 3:
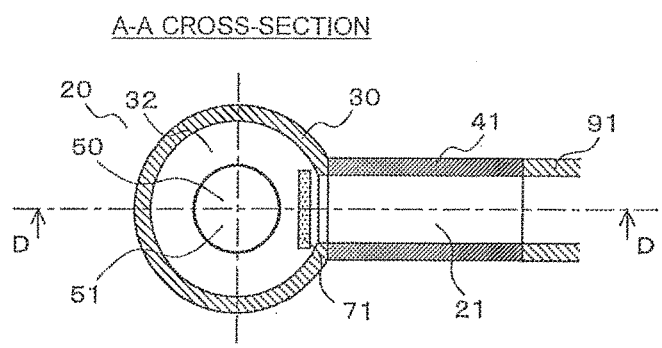
FIG. 3 is a cross-sectional view of the expansion valve according to Embodiment 1 of the present invention and of the pipe connected to the expansion valve taken along line A-A of FIG. 2.
Figure 4:
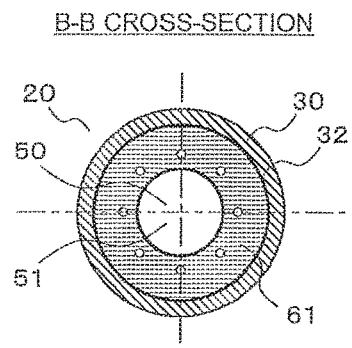
FIG. 4 is a cross-sectional view of the expansion valve according to Embodiment 1 of the present invention and of the pipe connected to the expansion valve taken along line B-B of FIG. 2.
Figure 5:
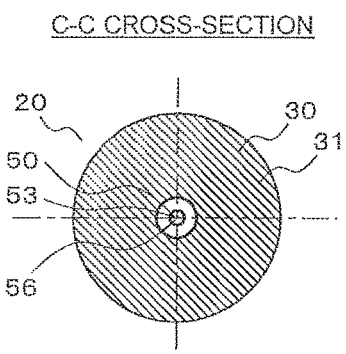
FIG. 5 is a cross-sectional view of the expansion valve according to Embodiment 1 of the present invention and of the pipe connected to the expansion valve taken along line C-C of FIG. 2.

FIG. 2 is a cross-sectional view of the expansion valve according to Embodiment 1 of the present invention and of pipes connected to the expansion valve in the axial direction of the expansion valve. FIG. 3 is a cross-sectional view of the expansion valve according to Embodiment 1 of the present invention and of the pipe connected to the expansion valve taken along line A-A of FIG. 2. FIG. 4 is a cross-sectional view of the expansion valve according to Embodiment 1 of the present invention and of the pipe connected to the expansion valve taken along line B-B of FIG. 2. FIG. 5 is a cross-sectional view of the expansion valve according to Embodiment 1 of the present invention and of the pipe connected to the expansion valve taken along line C-C of FIG. 2.

As FIGS. 2 to 5 illustrate, the expansion valve 20 includes a main body 30, a first connecting pipe 41, a second connecting pipe 42, a valve body 50, a first porous member 61, a second porous member 63, a first shield member 71, and a second shield member 72. A first pipe 91 is connected to the first connecting pipe 41 by, for example, brazing, and a second pipe 92 is connected to the second connecting pipe 42 by, for example, brazing. The first pipe 91 and the second pipe 92 constitute parts of the refrigerant circuit 10.

The main body 30 is made by, for example, cutting a brass casting. A first valve chamber 32 and a second valve chamber 33 separated by a partition wall 31 are provided in the main body 30. The first valve chamber 32 and the second valve chamber 33 communicate with each other via a valve hole 34 provided in the central part of the partition wall 31. The end portion of the valve hole 34 on the side where the first valve chamber 32 is provided is a first valve seat 35, and the end portion of the valve hole 34 on the side where the second valve chamber 33 is provided is a second valve seat 36.

A first opening 37 is formed on the side wall of the first valve chamber 32, and the first connecting pipe 41 is connected to the main body 30 by, for example, brazing. The axial direction of the first connecting pipe 41 and the axial direction of the end portion of the first pipe 91 connected to the first connecting pipe 41 are perpendicular to the gravitational direction. That is, the first valve chamber 32 and the first pipe 91 communicate with each other via the first opening 37 and the first connecting pipe 41. A second opening 38 is formed on the side wall of the second valve chamber 33, and the second connecting pipe 42 is connected to the main body 30 by, for example, brazing. The axial direction of the second connecting pipe 42 and the axial direction of the end portion of the second pipe 92 connected to the second connecting pipe 42 are perpendicular to the gravitational direction. That is, the second valve chamber 33 and the second pipe 92 communicate with each other via the second opening 38 and the second connecting pipe 42. It should be noted that in FIG. 2, the end faces of the first connecting pipe 41 and the second connecting pipe 42 are connected to the side wall of the main body 30; however, the configuration is not limited to this example, and the outer circumferential surface of the end portion of the first connecting pipe 41 may be connected to the inner circumferential surface of the first opening 37, and the outer circumferential surface of the end portion of the second connecting pipe 42 may be connected to the inner circumferential surface of the second opening 38. The first pipe 91 may be directly connected to the first opening 37, and the second pipe 92 may be directly connected to the second opening 38.

The valve body 50 includes a first main shaft 51, a second main shaft 52, and a constricted portion 53. The first main shaft 51 has a cylindrical shape, and a lower portion of the first main shaft 51 in the gravitational direction is provided inside the first valve chamber 32. The second main shaft 52 has a cylindrical shape, and an upper portion of the second main shaft 52 in the gravitational direction is provided inside the second valve chamber 33. The constricted portion 53 connects the lower portion of the first main shaft 51 in the gravitational direction and the upper portion of the second main shaft 52 in the gravitational direction to each other. The constricted portion 53 includes a first inclined portion 54 on the side of the first main shaft 51, a second inclined portion 55 on the side of the second main shaft 52, and a communicating portion 56 provided between the first inclined portion 54 and the second inclined portion 55. The communicating portion 56 of the constricted portion 53 is provided in the valve hole 34. The valve body 50 preferably includes more than one component.

A coil (not illustrated) is provided around the periphery of a part of the valve body 50. When the coil is energized, a position in a direction parallel to the gravitational direction of the valve body 50 changes. A gap between the valve body 50 and the first valve seat 35 and a gap between the valve body 50 and the second valve seat 36 serve as expansion portions. As the position in the direction parallel to the gravitational direction of the valve body 50 changes, the size (passage cross-sectional area) of the gap between the valve body 50 and the first valve seat 35 changes, and the size of the gap between the valve body 50 and the second valve seat 36 changes. Thus, the opening degree of the valve hole 34 is controlled. When the valve body 50 comes in contact with the first valve seat 35 or the second valve seat 36, the valve hole 34 is fully closed. When the gap between the valve body 50 and the first valve seat 35 and the gap between the valve body 50 and the second valve seat 36 become the maximum, the valve hole 34 is fully open.

The first porous member 61 is provided in the first valve chamber 32 and above the partition wall 31 in the gravitational direction, that is, provided in a first passage 21 between the valve hole 34 and the first pipe 91. The second porous member 63 is provided in the second valve chamber 33 and below the partition wall 31 in the gravitational direction, that is, provided in a second passage 22 between the valve hole 34 and the second pipe 92. The first porous member 61 is ring shaped and is provided to an area between the side wall of the first valve chamber 32 and the outer circumferential surface of the first main shaft 51. The second porous member 63 is ring shaped and is provided to an area between the side wall of the second valve chamber 33 and the outer circumferential surface of the second main shaft 52. The first porous member 61 is supported by the top surface of a first pedestal 62. The first porous member 61 is preferably provided in a region close to the valve hole 34, inside the first valve chamber 32 and in particular is preferably provided below the first opening 37 in the gravitational direction. The second porous member 63 is supported by the bottom surface of a second pedestal 64. The second porous member 63 is preferably provided in a region close to the valve hole 34, inside the second valve chamber 33, and in particular is preferably provided above the second opening 38 in the gravitational direction. The first porous member 61 and the second porous member 63 are preferably fixed to the side wall of the first valve chamber 32 and to the side wall of the second valve chamber 33, respectively, by caulking.

The first shield member 71 is provided in a region that is inside the first valve chamber 32 and between the first main shaft 51 of the valve body 50 and the first opening 37, that is, a region of the first passage 21 between the first porous member 61 and the first opening 37 so that an upper portion of the first shield member 71 in the gravitational direction is in contact with an upper portion of the first valve chamber 32 in the gravitational direction. The second shield member 72 is provided in a region that is inside the second valve chamber 33 and between the second main shaft 52 of the valve body 50 and the second opening 38, that is, a region of the second passage 22 between the second porous member 63 and the second opening 38 so that an upper portion of the second shield member 72 in the gravitational direction is in contact with an upper portion of the second valve chamber 33 in the gravitational direction. When the first shield member 71 and the second shield member 72 are viewed in the axial directions of the first opening 37 and the second opening 38, the outer circumferential surfaces of the first shield member 71 and the second shield member 72 are outside the inner circumferential surfaces of the first opening 37 and the second opening 38. For example, the first shield member 71 is press-fitted and fixed to a groove formed on the top surface of the first valve chamber 32. For example, the upper portion of the second shield member 72 is bent toward the second opening 38, and the bent portion is fixed to a portion of the side wall of the second valve chamber 33 above the second opening 38 in the gravitational direction.

The surface of the first shield member 71 opposed to the first opening 37 has a gap from the first opening 37. The surface of the second shield member 72 opposed to the second opening 38 has a gap from the second opening 38. Except for the upper portions of the first shield member 71 and the second shield member 72, the first shield member 71 and the second shield member 72 are not in contact with other components. That is, the first shield member 71 shields the part of the cross section of the first passage 21, more specifically, shields an upper portion of the cross section of the first passage 21 in the gravitational direction, but does not shield a lower portion of the cross section of the first passage 21 in the gravitational direction. The second shield member 72 shields the part of the cross section of the second passage 22, more specifically, shields an upper portion of the cross section of the second passage 22 in the gravitational direction, but does not shield a lower portion of the cross section of the second passage 22 in the gravitational direction.

Figure 6:
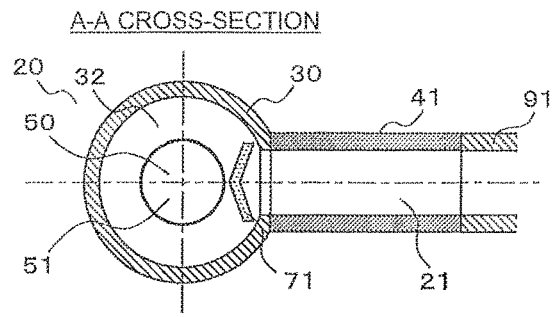
FIG. 6 is a cross-sectional view illustrating a modification example of the expansion valve according to Embodiment 1 of the present invention and of the pipe connected to the expansion valve taken along line A-A of FIG. 2.
Figure 7:
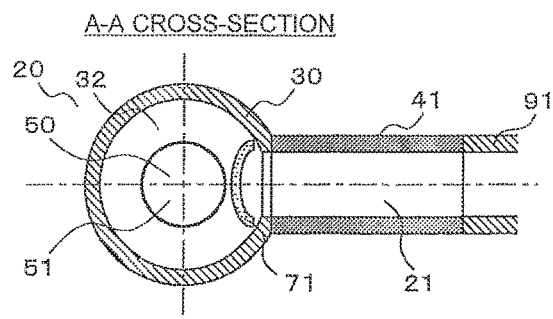
FIG. 7 is a cross-sectional view illustrating a modification example of the expansion valve according to Embodiment 1 of the present invention and of the pipe connected to the expansion valve taken along line A-A of FIG. 2.

FIGS. 6 and 7 are cross-sectional views illustrating modification examples of the expansion valve according to Embodiment 1 of the present invention and of the pipe connected to the expansion valve taken along line A-A of FIG. 2.

As FIG. 3 illustrates, the first shield member 71 and the second shield member 72 are flat plate-like components perpendicular to the axial direction of the first opening 37 and to the axial direction of the second opening 38, respectively. However, as FIG. 6 illustrates, the first shield member 71 and the second shield member 72 may be bent plate-like components in which central portions are recessed in the direction away from the first opening 37 and the second opening 38. Moreover, as FIG. 7 illustrates, the first shield member 71 and the second shield member 72 may be curved plate-like components in which central areas are recessed in the direction away from the first opening 37 and the second opening 38. That is, the parts of the first shield member 71 and the second shield member 72 at least have flat surfaces that are opposed to the first opening 37 and the second opening 38 with gaps from the first opening 37 and the second opening 38 and are perpendicular to the axial directions of the first opening 37 and the second opening 38 or recessed surfaces that are opposed to the first opening 37 and the second opening 38 with gaps from the first opening 37 and the second opening 38 and are recessed in the direction away from the first opening 37 and the second opening 38.

Figure 8:
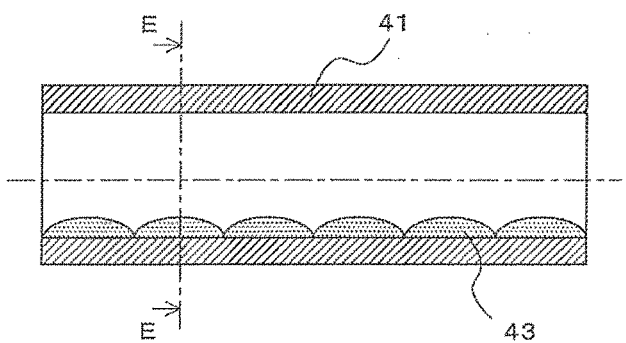
FIG. 8 is a cross-sectional view of the connecting pipe of the expansion valve according to Embodiment 1 of the present invention taken along line D-D of FIG. 3.
Figure 9:
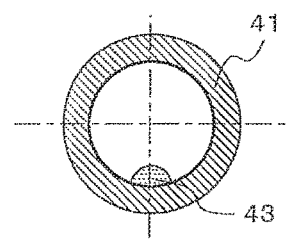
FIG. 9 is a cross-sectional view of the connecting pipe of the expansion valve according to Embodiment 1 of the present invention taken along line E-E of FIG. 8.
Figure 10:
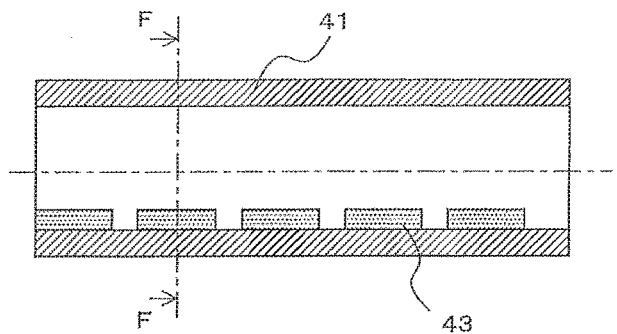
FIG. 10 is a cross-sectional view illustrating a modification example of the connecting pipe of the expansion valve according to Embodiment 1 of the present invention taken along line D-D of FIG. 3.
Figure 11:
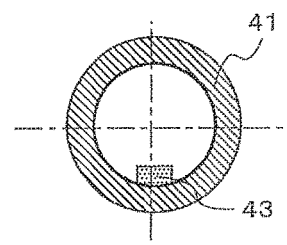
FIG. 11 is a cross-sectional view illustrating the modification example of the connecting pipe of the expansion valve according to Embodiment 1 of the present invention taken along line F-F of FIG. 10.

FIG. 8 is a cross-sectional view of the connecting pipe of the expansion valve according to Embodiment 1 of the present invention taken along line D-D of FIG. 3. FIG. 9 is a cross-sectional view of the connecting pipe of the expansion valve according to Embodiment 1 of the present invention taken along line E-E of FIG. 8. FIG. 10 is a cross-sectional view illustrating a modification example of the connecting pipe of the expansion valve according to Embodiment 1 of the present invention taken along line D-D of FIG. 3. FIG. 11 is a cross-sectional view illustrating the modification example of the connecting pipe of the expansion valve according to Embodiment 1 of the present invention taken along line F-F of FIG. 10.

The first connecting pipe 41 and the second connecting pipe 42 are, for example, copper pipes. As FIGS. 8 and 9 illustrate, projections and grooves are formed in the lower portions of the inner circumferential surfaces of the first connecting pipe 41 and the second connecting pipe 42 in the gravitational direction. The projections and grooves 43 are aligned in the axial directions of the first connecting pipe 41 and the second connecting pipe 42. The projections and grooves 43 may have a semicircular cross section or may have a rectangular cross section as illustrated in FIGS. 10 and 11. When the end faces of the first connecting pipe 41 and the second connecting pipe 42 are connected to the side wall of the main body 30, the projections and grooves 43 also are preferably formed in the inner circumferential surfaces of the first opening 37 and the second opening 38.

It should be noted that either the provision of the first shield member 71 and the second shield member 72 in the expansion valve 20 or the provision of the projections and grooves 43 in the inner circumferential surfaces of the first connecting pipe 41 and the second connecting pipe 42 of the expansion valve 20 may be performed. Both provisions may not have to be performed. When both of the provision of the first shield member 71 and the second shield member 72 in the expansion valve 20 and the provision of the projections and grooves 43 in the inner circumferential surfaces of the first connecting pipe 41 and the second connecting pipe 42 of the expansion valve 20 are performed, mixing effects of gas-phase refrigerant and liquid-phase refrigerant, which are described later, are further promoted.

<Effects of Expansion Valve>

Effects of the expansion valve according to Embodiment 1 are described below.

Effects of the first porous member 61 and the second porous member 63 are described first.

Figure 12:
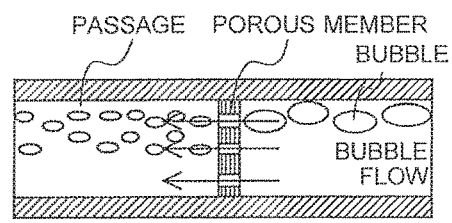
FIG. 12 is a schematic view for explaining effects of a first porous member and a second porous member of the expansion valve according to Embodiment 1 of the present invention.

FIG. 12 is a schematic view for explaining the effects of the first porous member and the second porous member of the expansion valve according to Embodiment 1 of the present invention.

Sounds caused by refrigerant are classified roughly into, for example, a refrigerant pulsation noise, a collision noise, a vortex sound, and a jet sound and become noise sources during the operation of the air-conditioning apparatus 1. The refrigerant pulsation noise is a structure-borne sound caused by refrigerant pulsation exciting natural oscillation of the expansion valve 20. When the refrigerant is in a two-phase gas-liquid state and bubbles are contained in the refrigerant, as FIG. 12 illustrates, the bubbles are atomized when the bubbles are passing through the first porous member 61 or the second porous member 63. Thus, the refrigerant pulsation at the expansion portions is suppressed.

Effects of the first shield member 71, the second shield member 72, and the projections and grooves 43 are described below.

Figure 13:
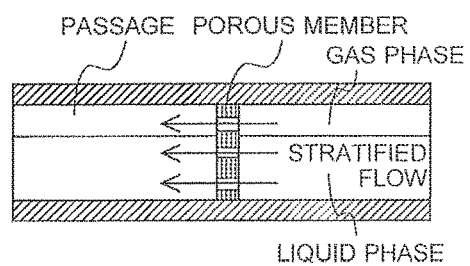
FIG. 13 is a schematic view for explaining effects of a first shield member, a second shield member, and projections and grooves of the expansion valve according to Embodiment 1 of the present invention.
Figure 14:
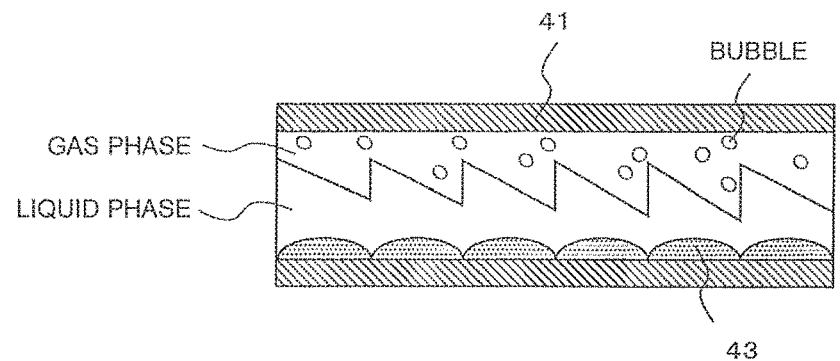
FIG. 14 is a cross-sectional view of the connecting pipe of the expansion valve according to Embodiment 1 of the present invention taken along line D-D of FIG. 3 and is a figure for explaining effects of the projections and grooves.
Figure 15:
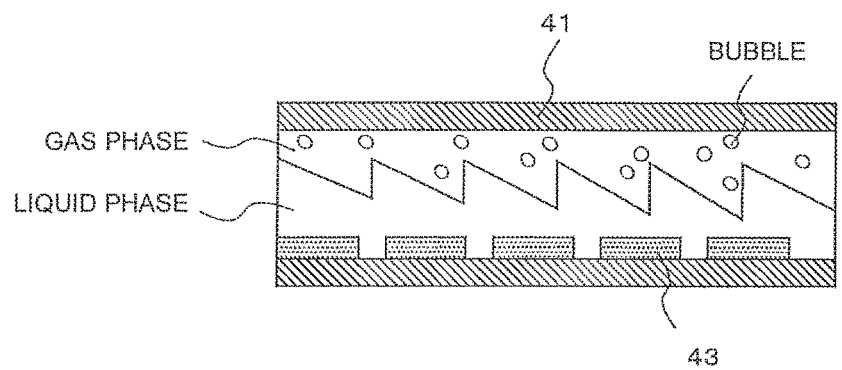
FIG. 15 is a cross-sectional view illustrating the modification example of the connecting pipe of the expansion valve according to Embodiment 1 of the present invention taken along line D-D of FIG. 3 and is a figure for explaining effects of the projections and grooves.

FIG. 13 is a schematic view for explaining the effects of the first shield member, the second shield member, and the projections and grooves of the expansion valve according to Embodiment 1 of the present invention. FIG. 14 is a cross-sectional view of the connecting pipe of the expansion valve according to Embodiment 1 of the present invention taken along line D-D of FIG. 3 and is a figure for explaining effects of the projections and grooves. FIG. 15 is a cross-sectional view illustrating the modification example of the connecting pipe of the expansion valve according to Embodiment 1 of the present invention taken along line D-D of FIG. 3 and is a figure for explaining effects of the projections and grooves.

When two-phase gas-liquid state refrigerant having high quality flows into the first connecting pipe 41 or the second connecting pipe 42 at a low rate, as FIG. 13 illustrates, the flow of the refrigerant becomes a two-phase flow (stratified flow) in which gas and liquid are separated, the gas-phase refrigerant is distributed to the upper portion of the first connecting pipe 41 or the second connecting pipe 42, and the liquid-phase refrigerant is distributed to the lower portion of the first connecting pipe 41 or the second connecting pipe 42. Even when the two-phase gas-liquid state refrigerant pass through the first porous member 61 or the second porous member 63 under such conditions, both of the liquid-phase refrigerant and the gas-phase refrigerant merely pass through the porous member, and bubbles are not atomized.

Meanwhile, when the first shield member 71 or the second shield member 72 is provided in the expansion valve 20, the gas-phase refrigerant and the liquid-phase refrigerant are actively mixed at the first shield member 71 or the second shield member 72, causing a bubble flow as illustrated in FIG. 12, and refrigerant pulsation at the expansion portions is suppressed.

When projections and grooves are formed in the first connecting pipe 41 or the second connecting pipe 42 and are aligned in the axial direction of the first connecting pipe 41 or the second connecting pipe 42, the gas-phase refrigerant and the liquid-phase refrigerant are actively mixed at the projections and grooves 43. Thus, as FIGS. 14 and 15 illustrate, a bubble flow is caused, and refrigerant pulsation at the expansion portions is suppressed.

Details of the state of the refrigerant flowing through the expansion valve 20 are described below.

A case in which the refrigerant flows through the expansion valve 20 in the positive direction (direction from the first connecting pipe 41 toward the second connecting pipe 42) is described first.

When the two-phase gas-liquid state refrigerant having high quality flows into the first connecting pipe 41 at a low rate, the flow of the refrigerant becomes a two-phase flow (stratified flow) in which gas and liquid are separated, the gas-phase refrigerant is distributed to the upper portion of the first connecting pipe 41, and the liquid-phase refrigerant is distributed to the lower portion of the first connecting pipe 41. The projections and grooves 43 are formed in the lower portion of the first connecting pipe 41 in the gravitational direction and are aligned in the axial direction of the first connecting pipe 41. Thus, the liquid-phase refrigerant flows through the projections and grooves in turn, and as FIGS. 14 and 15 illustrate, the liquid-phase refrigerant undulates. When the liquid-phase refrigerant undulates, the gas-phase refrigerant and the liquid-phase refrigerant are mixed, and a gas-liquid mixed flow is generated. By forming the projections and grooves 43 in the lower portion, in the gravitational direction, of the first connecting pipe 41 perpendicular to the gravitational direction, mixing effects of the gas-phase refrigerant and the liquid-phase refrigerant improve.

Even when the projections and grooves 43 aligned in the axial direction of the first connecting pipe 41 are not formed in the lower portion of the first connecting pipe 41 in the gravitational direction, the gas-phase refrigerant and the liquid-phase refrigerant are mixed by the two-phase flow (stratified flow) in which gas and liquid are separated colliding with the first shield member 71. Thus, the two-phase flow becomes a gas-liquid mixed flow. Also, when the projections and grooves 43 aligned in the axial direction of the first connecting pipe 41 are formed in the lower portion of the first connecting pipe 41 in the gravitational direction, the mixing effects of the gas-phase refrigerant and the liquid-phase refrigerant are further promoted by the two-phase flow (stratified flow) in which gas and liquid are separated colliding with the first shield member 71.

That is, since the first shield member 71 does not shield the lower portion of the cross-section of the first passage 21 in the gravitational direction, the gas-phase refrigerant flowing through the upper portion of the first connecting pipe 41 in the gravitational direction collides with the first shield member 71 and is pushed below the first shield member 71. Thus, the mixing effects of the gas-phase refrigerant and the liquid-phase refrigerant are promoted. When the first shield member 71 is not provided, the two-phase flow (stratified flow) in which gas and liquid are separated collides with the cylindrical outer circumferential surface of the first main shaft 51 of the valve body 50 and goes around the outer circumferential surface. Thus, the mixing effects of the gas-phase refrigerant and the liquid-phase refrigerant are insufficient. Provision of an expansion portion in first passage 21 between the first connecting pipe 41 and the first porous member 61 enables improvement of the mixing effects of the gas-phase refrigerant and the liquid-phase refrigerant but increases a pressure loss and limits a flow-rate control range for the expansion valve 20, thereby decreasing the function of the expansion valve 20. However, when the mixing effects of the gas-phase refrigerant and the liquid-phase refrigerant are improved by providing the first shield member 71, an increase of the pressure loss can be suppressed.

When the mixed flow in which the gas and liquid are mixed passes through the first porous member 61, bubbles contained in the liquid-phase refrigerant are atomized and the state of the mixed flow approaches the state of a homogeneous flow. The mixed flow similar to the homogeneous flow flows into the expansion portion, and thus the refrigerant pulsation due to the alternate flow of the gas and liquid can be suppressed, and the natural oscillation of the expansion valve 20 can be suppressed. Discontinuous refrigerant sounds can be also suppressed.

When the refrigerant passes through the expansion portion, a rate at the refrigerant flow increases and the refrigerant expands. Then, the rate decreases when the expanded refrigerant passes through the second porous member 63. Thus, a collision noise caused by the refrigerant colliding with the wall surface of the second valve chamber 33 is suppressed. Moreover, by passing through the expansion portion, the mixed flow in which the gas and liquid are mixed becomes a flow in which bubbles are further atomized.

The second shield member 72 does not affect the flow of the refrigerant passing through the expansion portion. Thus, the refrigerant passes through the second opening 38 without being affected by the second shield member 72. In the second connecting pipe 42, the bubbles are combined, and the flow of the refrigerant becomes a two-phase flow (stratified flow) in which the gas-phase refrigerant and the liquid-phase refrigerant are separated.

When the flow of the two-phase gas-liquid state refrigerant having high quality becomes a mist flow having a high flow rate and the mist flow flows into the first connecting pipe 41, the mixing effects of the gas-phase refrigerant and the liquid-phase refrigerant are promoted with the first shield member 71 and the projections and grooves 43 aligned in the axial direction of the first connecting pipe 41. Since bubbles are atomized in the first porous member 61, noise decreases as with the case in which the flow is the two-phase flow (stratified flow) in which the gas-phase refrigerant and the liquid-phase refrigerant are separated.

A case in which the refrigerant flows through the expansion valve 20 in the negative direction (direction from the second connecting pipe 42 toward the first connecting pipe 41) is described below.

The expansion valve 20 has similar structures above and below the partition wall 31. Thus, as with the case in which the refrigerant flows through the expansion valve 20 in the positive direction (direction from the first connecting pipe 41 toward the second connecting pipe 42), also in the case in which the refrigerant flows through the expansion valve 20 in the negative direction (direction from the second connecting pipe 42 toward the first connecting pipe 41), noise decreases.

It should be noted that in the above description, the first shield member 71 is provided in the first valve chamber 32 and the second shield member 72 is provided in the second valve chamber 33; however, a case in which the first shield member 71 is provided in the first valve chamber 32 but the second shield member 72 is not provided in the second valve chamber 33 can be employed. Moreover, a case in which the first shield member 71 is not provided in the first valve chamber 32 but the second shield member 72 is provided in the second valve chamber 33 can be employed. In the case in which the first shield member 71 is not provided in the first valve chamber 32 but the second shield member 72 is provided in the second valve chamber 33, the second shield member 72 corresponds to the "first shield member" of the present invention.

In the above description, the projections and grooves 43 are formed in the first connecting pipe 41, that is, a region of the first passage 21 between the first pipe 91 and the first valve chamber 32, and the projections and grooves 43 are formed in the second connecting pipe 42, that is, a region of the second passage 22 between the second pipe 92 and the second valve chamber 33. However, a case in which the projections and grooves 43 are formed in a region of the first passage 21 between the first pipe 91 and the first valve chamber 32 but the projections and grooves 43 are not formed in a region of the second passage 22 between the second pipe 92 and the second valve chamber 33 can be employed. Moreover, a case in which the projections and grooves 43 are not formed in a region of the first passage 21 between the first pipe 91 and the first valve chamber 32 but the projections and grooves 43 are formed in a region of the second passage 22 between the second pipe 92 and the second valve chamber 33 can be employed. In the case in which the projections and grooves 43 are not formed in a region of the first passage 21 between the first pipe 91 and the first valve chamber 32 but the projections and grooves 43 are formed in a region of the second passage 22 between the second pipe 92 and the second valve chamber 33, the second passage 22 corresponds to the "first passage" of the present invention.

In the above description, the projections and grooves 43 are provided in a region of the first passage 21 between the first pipe 91 and the first valve chamber 32 and in a region of the second passage 22 between the second pipe 92 and the second valve chamber 33. However, the present invention is not limited to this case. For example, when the first pipe 91 is directly connected to the first opening 37 and the second pipe 92 is directly connected to the second opening 38, the projections and grooves 43 is preferably provided in the inner circumferential surfaces of the first pipe 91 and the second pipe 92. In such a case, the projections and grooves 43 is provided in the lower portion of the inner circumferential surface of the first pipe 91 in the gravitational direction, but the projections and grooves 43 need not be provided in the lower portion of the inner circumferential surface of the second pipe 92 in the gravitational direction. Moreover, the projections and grooves 43 need not be provided in the lower portion of the inner circumferential surface of the first pipe 91 in the gravitational direction, but the projections and grooves 43 is provided in the lower portion of the inner circumferential surface of the second pipe 92 in the gravitational direction. In the case in which the projections and grooves 43 are not provided in the lower portion of the inner circumferential surface of the first pipe 91 in the gravitational direction, but the projections and grooves 43 are provided in the lower portion of the inner circumferential surface of the second pipe 92 in the gravitational direction, the second pipe 92 corresponds to the "first pipe" of the present invention.

Figure 16:
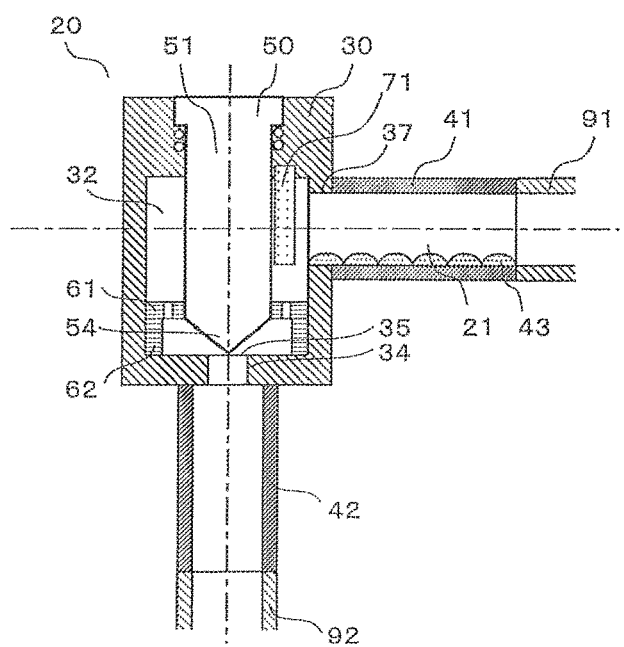
FIG. 16 is a cross-sectional view illustrating a modification example of the expansion valve according to Embodiment 1 of the present invention and the pipes connected to the expansion valve in the axial direction of the expansion valve.
Figure 17:
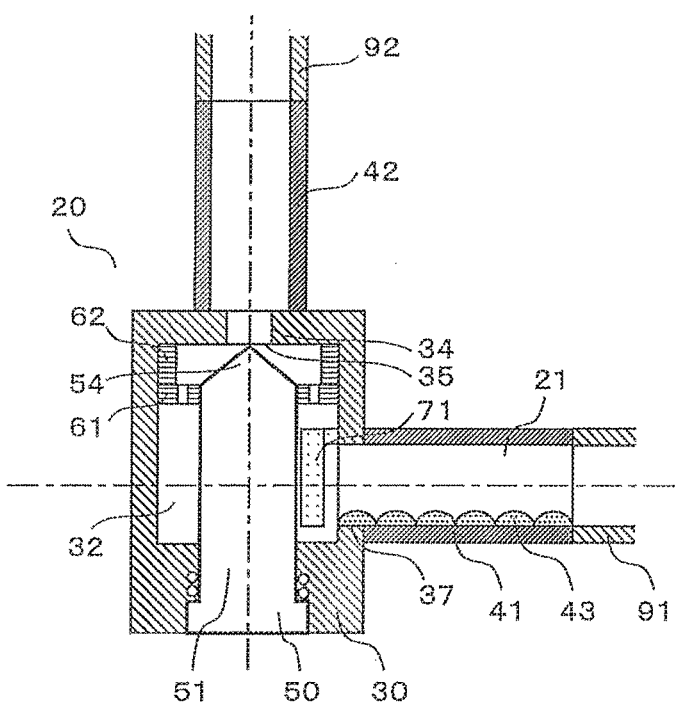
FIG. 17 is a cross-sectional view illustrating a modification example of the expansion valve according to Embodiment 1 of the present invention and the pipes connected to the expansion valve in the axial direction of the expansion valve.

FIGS. 16 and 17 are cross-sectional views illustrating modification examples of the expansion valve according to Embodiment 1 of the present invention and pipes connected to the expansion valve in the axial direction of the expansion valve.

In the above description, the first valve chamber 32 and the second valve chamber 33 are provided in the main body 30 of the expansion valve 20, and the valve body 50 of the expansion valve 20 includes the first main shaft 51 and the second main shaft 52. However, the present invention is not limited to this case. As FIGS. 16 and 17 illustrate, only the first valve chamber 32 may be formed in the main body 30 of the expansion valve 20, and the valve body 50 of the expansion valve 20 may only include the first main shaft 51. In such a case, as FIG. 16 illustrates, the first main shaft 51 may be provided above the valve hole 34 in the gravitational direction, and as FIG. 17 illustrates, the first main shaft 51 may be provided below the valve hole 34 in the gravitational direction.

REFERENCE SIGNS LIST 1 air-conditioning apparatus 10 refrigerant circuit 11 compressor 12 four-way valve 13 heat source side heat exchanger 14 first expansion valve second expansion valve 16 load side heat exchanger 17 extension pipe extension pipe 20 expansion valve 21 first passage 22 second passage 30 main body 31 partition wall 32 first valve chamber 33 second valve chamber 34 valve hole 35 first valve seat 36 second valve seat 37 first opening 38 second opening 41 first connecting pipe 42 second connecting pipe 43 projections and grooves 50 valve body 51 first main shaft 52 second main shaft 53 constricted portion 54 first inclined portion 55 second inclined portion 56 communicating portion 61 first porous member 62 first pedestal 63 second porous member 64 second pedestal first shield member 72 second shield member 91 first pipe 92 second pipe

The invention claimed is:

1. An expansion valve comprising:
a main body including a first valve chamber having a first opening communicating with a first pipe, a second valve chamber having a second opening communicating with a second pipe, and a valve hole connecting the first valve chamber and the second valve chamber to each other;
a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other;
a first porous member provided in a first passage between the first pipe and the valve hole; and
a first shield member provided in a region of the first passage between the first pipe and the first porous member, and configured to shield a part of a passage cross-section of the first passage,
the first shield member shielding an upper portion of the passage cross-section in a gravitational direction, and not shielding a lower portion of the passage cross-section in the gravitational direction.

2. The expansion valve of claim 1, wherein projections and grooves are formed in a lower portion, in the gravitational direction, of an inner circumferential surface of a region of the first passage between the first pipe and the first valve chamber, the projections and grooves being aligned in an axial direction of the first passage.

3. The expansion valve of claim 1, further comprising:
a second porous member provided in a second passage between the second pipe and the valve hole; and
a second shield member provided in a region of the second passage between the second pipe and the second porous member, and configured to shield a part of a passage cross-section of the second passage,
wherein the second shield member shields an upper portion of the passage cross-section in the gravitational direction, and does not shield a lower portion of the passage cross-section in the gravitational direction.

4. The expansion valve of claim 3, wherein projections and grooves are formed in a lower portion, in the gravitational direction, of an inner circumferential surface of a region of the second passage between the second pipe and the second valve chamber, the projections and grooves being aligned in an axial direction of the second passage.

5. The expansion valve of claim 3, wherein the second shield member is provided in the second valve chamber, has, on at least a part of the second shield member, a flat surface opposed to the second opening with a gap between the flat surface and the second opening and perpendicular to an axial direction of the second opening, or a recessed surface opposed to the second opening with a gap between the recessed surface and the second opening and recessed in a direction away from the second opening.

6. A refrigeration cycle apparatus comprising:
the expansion valve of claim 1; and
the first pipe,
wherein projections and grooves are formed in a lower portion of an inner circumferential surface of the first pipe in the gravitational direction, the projections and grooves being aligned in an axial direction of the first pipe.

7. An expansion valve comprising:
a main body including a first valve chamber having a first opening communicating with a first pipe, a second valve chamber having a second opening communicating with a second pipe, and a valve hole connecting the first valve chamber and the second valve chamber to each other;
a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other;
a first porous member provided in a first passage between the first pipe and the valve hole;
a first shield member provided in a region of the first passage between the first pipe and the first porous member, and configured to shield a part of a passage cross-section of the first passage;
a second porous member provided in a second passage between the second pipe and the valve hole; and
a second shield member provided in a region of the second passage between the second pipe and the second porous member, and configured to shield a part of a passage cross-section of the second passage,
the second shield member shielding an upper portion of the passage cross-section in a gravitational direction, and not shielding a lower portion of the passage cross-section in the gravitational direction.

8. A refrigeration cycle apparatus comprising:
the expansion valve of claim 7; and
the first pipe,
wherein projections and grooves are formed in a lower portion of an inner circumferential surface of the first pipe in the gravitational direction, the projections and grooves being aligned in an axial direction of the first pipe.

9. An expansion valve comprising:
a main body including a first valve chamber having a first opening communicating with a first pipe, a second valve chamber having a second opening communicating with a second pipe, and a valve hole connecting the first valve chamber and the second valve chamber to each other;
a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other;
a first porous member provided in a first passage between the first pipe and the valve hole;

a second porous member provided in a second passage between the second pipe and the valve hole; and a second shield member provided in a region of the second passage between the second pipe and the second porous member, and configured to shield a part of a passage cross-section of the second passage, projections and grooves being formed in a lower portion, in a gravitational direction, of an inner circumferential surface of a region of the first passage between the first pipe and the first valve chamber, the projections and grooves being aligned in an axial direction of the first passage, the second shield member shielding an upper portion of the passage cross-section in the gravitational direction, and not shielding a lower portion of the passage cross-section in the gravitational direction.

10. A refrigeration cycle apparatus comprising:
the expansion valve of claim 9; and
the first pipe,
wherein projections and grooves are formed in a lower portion of an inner circumferential surface of the first pipe in the gravitational direction, the projections and grooves being aligned in the axial direction of the first pipe.

11. An expansion valve comprising:
a main body including a first valve chamber having a first opening communicating with a first pipe, a second valve chamber having a second opening communicating with a second pipe, and a valve hole connecting the first valve chamber and the second valve chamber to each other;
a valve body including a first main shaft, at least a part of which is provided in the first valve chamber, a second main shaft, at least a part of which is provided in the second valve chamber, and a constricted portion provided in the valve hole and connecting the first main shaft and the second main shaft to each other;
a first porous member provided in a first passage between the first pipe and the valve hole; and
a first shield member provided in a region of the first passage between the first pipe and the first porous member, and configured to shield a part of a passage cross-section of the first passage,
the first shield member being provided in the first valve chamber, having, on at least a part of the first shield member, a flat surface opposed to the first opening with a gap between the flat surface and the first opening and perpendicular to an axial direction of the first opening, or a recessed surface opposed to the first opening with a gap between the recessed surface and the first opening and recessed in a direction away from the first opening.

12. The expansion valve of claim 11, further comprising:
a second porous member provided in a second passage between the second pipe and the valve hole; and
a second shield member provided in a region of the second passage between the second pipe and the second porous member, and configured to shield a part of a passage cross-section of the second passage, wherein the second shield member shields an upper portion of the passage cross-section in a gravitational direction, and does not shield a lower portion of the passage cross-section in the gravitational direction.

13. The expansion valve of claim 12, wherein projections and grooves are formed in a lower portion, in the gravitational direction, of an inner circumferential surface of a region of the second passage between the second pipe and the second valve chamber, the projections and grooves being aligned in an axial direction of the second passage.

14. The expansion valve of claim 12, wherein the second shield member is provided in the second valve chamber, has, on at least a part of the second shield member, a flat surface opposed to the second opening with a gap between the flat surface and the second opening and perpendicular to an axial direction of the second opening, or a recessed surface opposed to the second opening with a gap between the recessed surface and the second opening and recessed in a direction away from the second opening.

15. A refrigeration cycle apparatus comprising:
the expansion valve of claim 11; and
the first pipe,
wherein projections and grooves are formed in a lower portion of an inner circumferential surface of the first pipe in the gravitational direction, the projections and grooves being aligned in the axial direction of the first pipe.

16. An expansion valve comprising:
a main body including a first valve chamber having a first opening communicating with a first pipe, and a valve hole connecting the first valve chamber and a second pipe to each other;
a valve body configured to control an opening degree of the valve hole;
a first porous member provided in a first passage between the first pipe and the valve hole; and
a first shield member provided in a region of the first passage between the first pipe and the first porous member, and configured to shield a part of a passage cross-section of the first passage,
the first shield member being provided in the first valve chamber, having, on at least a part of the first shield member, a flat surface opposed to the first opening with a gap between the flat surface and the first opening and perpendicular to an axial direction of the first opening, or a recessed surface opposed to the first opening with a gap between the recessed surface and the first opening and recessed in a direction away from the first opening.

17. A refrigeration cycle apparatus comprising:
the expansion valve of claim 16; and
the first pipe,
wherein projections and grooves are formed in a lower portion of an inner circumferential surface of the first pipe in a gravitational direction, the projections and grooves being aligned in the axial direction of the first pipe.

* * * * *